US007898539B2

(12) United States Patent
Bae et al.

(10) Patent No.: US 7,898,539 B2
(45) Date of Patent: Mar. 1, 2011

(54) DISPLAY DRIVE INTEGRATED CIRCUIT AND METHOD FOR GENERATING SYSTEM CLOCK SIGNAL

(75) Inventors: Jong-kon Bae, Seocho-gu (KR); Kyu-young Chung, Songpa-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1028 days.

(21) Appl. No.: 11/712,968

(22) Filed: Mar. 2, 2007

(65) Prior Publication Data

US 2007/0205971 A1 Sep. 6, 2007

(30) Foreign Application Priority Data

Mar. 3, 2006 (KR) ........................ 10-2006-0020395

(51) Int. Cl.
*G09G 5/00* (2006.01)
*H04N 5/05* (2006.01)

(52) U.S. Cl. ........... 345/213; 345/99; 348/500; 348/524; 348/536; 348/537

(58) Field of Classification Search .................... 345/99, 345/213
See application file for complete search history.

(56) References Cited

U.S. PATENT DOCUMENTS

| | | | | |
|---|---|---|---|---|
| 4,573,176 | A * | 2/1986 | Yeager | 377/48 |
| 4,633,194 | A * | 12/1986 | Kikuchi et al. | 331/25 |
| 4,780,759 | A * | 10/1988 | Matsushima et al. | 348/537 |
| 5,142,247 | A * | 8/1992 | Lada et al. | 331/14 |
| 5,168,360 | A | 12/1992 | Maeshima | |
| 5,432,559 | A * | 7/1995 | Bruins et al. | 348/525 |
| 5,479,073 | A * | 12/1995 | Mamiya et al. | 315/169.3 |
| 5,729,179 | A * | 3/1998 | Sumi | 331/12 |
| 5,767,917 | A * | 6/1998 | Gornstein et al. | 348/543 |
| 5,796,391 | A * | 8/1998 | Chiu et al. | 345/204 |
| 5,821,910 | A * | 10/1998 | Shay | 345/99 |
| 5,872,601 | A * | 2/1999 | Seitz | 348/558 |
| 5,929,711 | A * | 7/1999 | Ito | 331/1 A |
| 5,945,983 | A * | 8/1999 | Kanno et al. | 345/204 |
| 6,008,789 | A * | 12/1999 | Anai et al. | 345/99 |
| 6,121,950 | A * | 9/2000 | Zavracky et al. | 345/101 |
| 6,185,691 | B1 * | 2/2001 | Gandhi et al. | 713/500 |
| 6,275,553 | B1 * | 8/2001 | Esaki | 375/371 |
| 6,310,618 | B1 * | 10/2001 | Zhang et al. | 345/213 |
| 6,310,922 | B1 * | 10/2001 | Canfield et al. | 375/240.28 |
| 6,392,641 | B1 * | 5/2002 | Nishimura et al. | 345/213 |
| 6,515,708 | B1 * | 2/2003 | Kato | 348/524 |
| 6,531,903 | B1 * | 3/2003 | Wichman | 327/117 |
| 6,618,462 | B1 * | 9/2003 | Ross et al. | 377/48 |

(Continued)

FOREIGN PATENT DOCUMENTS

JP 09186976 A * 7/1997

(Continued)

*Primary Examiner* — Bipin Shalwala
*Assistant Examiner* — Dorothy Webb
(74) *Attorney, Agent, or Firm* — Volentine & Whitt, PLLC

(57) ABSTRACT

A display drive integrated circuit is for driving a display panel. The display drive integrated circuit includes a division rate output unit which outputs as a division rate corresponding to a quotient obtained by dividing by M a total number of clock cycles of a dot clock signal corresponding to a clock cycle of a horizontal synchronization signal, where M is a natural number, and a system clock generating unit which generates a system clock signal by dividing the dot clock signal using the division rate.

18 Claims, 6 Drawing Sheets

U.S. PATENT DOCUMENTS

| | | | | |
|---|---|---|---|---|
| 6,661,846 | B1 * | 12/2003 | Ota | 375/240.28 |
| 6,667,638 | B1 * | 12/2003 | Kramer et al. | 327/115 |
| 6,677,786 | B2 * | 1/2004 | Kellgren et al. | 327/116 |
| 6,731,343 | B2 * | 5/2004 | Yoneno | 348/537 |
| 6,738,922 | B1 * | 5/2004 | Warwar et al. | 713/503 |
| 6,779,125 | B1 * | 8/2004 | Haban | 713/500 |
| 6,885,401 | B1 * | 4/2005 | Nakai et al. | 348/312 |
| 6,950,958 | B2 * | 9/2005 | Magen | 713/500 |
| 2001/0017659 | A1 * | 8/2001 | Suzuki | 348/312 |
| 2002/0054238 | A1 * | 5/2002 | Kunio | 348/537 |
| 2003/0061086 | A1 * | 3/2003 | Chen et al. | 705/8 |
| 2003/0090303 | A1 * | 5/2003 | Kimura et al. | 327/115 |
| 2003/0193355 | A1 * | 10/2003 | Leifso et al. | 327/115 |
| 2003/0229815 | A1 * | 12/2003 | Fujiwara et al. | 713/500 |
| 2004/0012581 | A1 | 1/2004 | Kurokawa et al. | |
| 2005/0212570 | A1 * | 9/2005 | Sun et al. | 327/115 |
| 2006/0197869 | A1 * | 9/2006 | Wang et al. | 348/537 |

FOREIGN PATENT DOCUMENTS

| | | |
|---|---|---|
| JP | 09-297555 | 11/1997 |
| JP | 09305158 A * | 11/1997 |
| JP | 10-153989 | 6/1998 |
| KR | 1998-079216 | 11/1998 |

* cited by examiner

| BINARY NUMBER | 512 | 256 | 128 | 64 | 32 | 16 | 8 | 4 | 2 | 1 |
|---|---|---|---|---|---|---|---|---|---|---|
| n=272 | 0 | 1 | 0 | 0 | 0 | 1 | 0 | 0 | 0 | 0 |
| n=500 | 0 | 1 | 1 | 1 | 1 | 1 | 0 | 1 | 0 | 0 |
| n=730 | 1 | 0 | 1 | 1 | 0 | 1 | 1 | 0 | 1 | 0 |
| ······ | | | | | | | | | | |
| n=1008 | 1 | 1 | 1 | 1 | 1 | 1 | 0 | 0 | 0 | 0 |

FIG. 6

| MINIMUM NUMBER OF CLOCK CYCLES (DOTCLK) | MAXIMUM NUMBER OF CLOCK CYCLES (DOTCLK) | DIVISION RATE | FIRST MINIMUM NUMBER OF CLOCK CYCLES (SYSCLK) | FIRST MAXIMUM NUMBER OF CLOCK CYCLES (SYSCLK) | SECOND MINIMUM NUMBER OF CLOCK CYCLES (SYSCLK) | SECOND MAXIMUM NUMBER OF CLOCK CYCLES (SYSCLK) |
|---|---|---|---|---|---|---|
| 256 | 271 | 16 | 16 | 16.94 | 16 | 16.94 |
| 272 | 287 | 17 | 16 | 16.88 | 17 | 17.94 |
| 288 | 303 | 18 | 16 | 16.83 | 16 | 16.83 |
| 304 | 319 | 19 | 16 | 16.79 | 16.88888889 | 17.72 |
| 320 | 335 | 20 | 16 | 16.75 | 16 | 16.75 |
| 336 | 351 | 21 | 16 | 16.71 | 16.8 | 17.55 |
| 352 | 367 | 22 | 16 | 16.68 | 16 | 16.68 |
| 368 | 383 | 23 | 16 | 16.65 | 16.72727273 | 17.41 |
| 384 | 399 | 24 | 16 | 16.63 | 16 | 16.63 |
| 400 | 415 | 25 | 16 | 16.60 | 16.66666667 | 17.29 |
| 416 | 431 | 26 | 16 | 16.58 | 16 | 16.58 |
| 432 | 447 | 27 | 16 | 16.56 | 16.61538462 | 17.19 |
| 448 | 463 | 28 | 16 | 16.54 | 16 | 16.54 |
| 464 | 479 | 29 | 16 | 16.52 | 16.57142857 | 17.11 |
| 480 | 495 | 30 | 16 | 16.50 | 16 | 16.50 |
| 496 | 511 | 31 | 16 | 16.48 | 16.53333333 | 17.03 |
| 512 | 527 | 32 | 16 | 16.47 | 16 | 16.47 |
| 528 | 543 | 33 | 16 | 16.45 | 16.5 | 16.97 |
| 544 | 559 | 34 | 16 | 16.44 | 16 | 16.44 |
| 560 | 575 | 35 | 16 | 16.43 | 16.47058824 | 16.91 |
| 576 | 591 | 36 | 16 | 16.42 | 16 | 16.42 |
| 592 | 607 | 37 | 16 | 16.41 | 16.44444444 | 16.86 |
| 608 | 623 | 38 | 16 | 16.39 | 16 | 16.39 |
| 624 | 639 | 39 | 16 | 16.38 | 16.42105263 | 16.82 |
| 640 | 655 | 40 | 16 | 16.38 | 16 | 16.38 |
| 656 | 671 | 41 | 16 | 16.37 | 16.4 | 16.78 |
| 672 | 687 | 42 | 16 | 16.36 | 16 | 16.36 |
| 688 | 703 | 43 | 16 | 16.35 | 16.38095238 | 16.74 |
| 704 | 719 | 44 | 16 | 16.34 | 16 | 16.34 |
| 720 | 735 | 45 | 16 | 16.33 | 16.36363636 | 16.70 |
| 736 | 751 | 46 | 16 | 16.33 | 16 | 16.33 |
| 752 | 767 | 47 | 16 | 16.32 | 16.34782609 | 16.67 |
| 768 | 783 | 48 | 16 | 16.31 | 16 | 16.31 |
| 784 | 799 | 49 | 16 | 16.31 | 16.33333333 | 16.65 |
| 800 | 815 | 50 | 16 | 16.30 | 16 | 16.30 |
| 816 | 831 | 51 | 16 | 16.29 | 16.32 | 16.62 |
| 832 | 847 | 52 | 16 | 16.29 | 16 | 16.29 |
| 848 | 863 | 53 | 16 | 16.28 | 16.30769231 | 16.60 |
| 864 | 879 | 54 | 16 | 16.28 | 16 | 16.28 |
| 880 | 895 | 55 | 16 | 16.27 | 16.2962963 | 16.57 |
| 896 | 911 | 56 | 16 | 16.27 | 16 | 16.27 |
| 912 | 927 | 57 | 16 | 16.26 | 16.28571429 | 16.55 |
| 928 | 943 | 58 | 16 | 16.26 | 16 | 16.26 |
| 944 | 959 | 59 | 16 | 16.25 | 16.27586207 | 16.53 |
| 960 | 975 | 60 | 16 | 16.25 | 16 | 16.25 |
| 976 | 991 | 61 | 16 | 16.25 | 16.26666667 | 16.52 |
| 992 | 1007 | 62 | 16 | 16.24 | 16 | 16.24 |
| 1008 | 1023 | 63 | 16 | 16.24 | 16.25806452 | 16.50 |

DISPLAY DRIVE INTEGRATED CIRCUIT AND METHOD FOR GENERATING SYSTEM CLOCK SIGNAL

BACKGROUND OF THE INVENTION

1. Field of the Invention

The present invention generally relates to a display drive integrated circuit for driving a display panel, and more particularly, the present invention relates to a display drive integrated circuit and method for generating a system clock signal.

A claim of priority is made to Korean Patent Application No. 10-2006-0020395, filed Mar. 3, 2006, in the Korean Intellectual Property Office, the disclosure of which is incorporated herein in its entirety by reference.

2. Description of the Related Art

FIG. 1 is a simplified block diagram of a conventional display device 100. Referring to FIG. 1, the conventional display device 100 includes a display panel 110, a timing controller 130, a gate driver circuit (i.e., a scan line driving circuit) 140, a source driver circuit (i.e., a data line driving circuit) 150, and a processor 170. The timing controller 130, the gate driver circuit 140 and the source driver circuit 150 together constitute a display drive circuit 120 of the display device 100.

As shown in FIG. 1, the timing controller 130 includes a memory 131, and outputs control signals for controlling the timing of the gate driver circuit 140 and the source driver circuit 150. The memory 131 stores display data, and outputs display data (or image data) to the source driver circuit 150 under the control of the timing controller 130.

The gate driver circuit 140 includes a plurality of gate drivers (not shown), and continuously drives scan lines G1 through GM of the display panel 110, based on the control signals received from the timing controller 130.

The source driver circuit 150 includes a plurality of source drivers (not shown), and drives data lines S1 through SN of the display panel 110, based on the display data received from the memory 131 and the control signals received from the timing controller 130.

The display panel 110 displays the display data based on signals received from the gate driver circuit 140 and signals received from the source driver circuit 150.

The timing controller 130 receives various display data and control signals from the processor 170 via an interface 160, and updates the display data stored in the memory 131.

Examples of the processor 170 include a baseband processor and a graphics processor. When the display device 100 is configured with a baseband processor, a CPU interface establishes an interface between the display device 100 and the baseband processor. When the display device 100 is configured with a graphics processor, an RGB interface (video interface) establishes an interface between the display device 100 and the graphics processor.

In the case where an RGB interface is utilized, the display device 100 receives a vertical synchronization signal, a horizontal synchronization signal, and a dot clock signal from an external source, and generates a corresponding system clock signal. The system clock signal is used to control the display data.

However, when the frequency of the dot clock signal received from the external source changes, the frequency of the system clock signal also changes, thereby degrading the display quality of the display device 100 or increasing its power consumption.

SUMMARY OF THE INVENTION

According to an aspect of the present invention, a display drive integrated circuit for driving a display panel is provided. The display drive integrated circuit includes a division rate output unit which outputs as a division rate corresponding to a quotient obtained by dividing by M a total number of clock cycles of a dot clock signal corresponding to a clock cycle of a horizontal synchronization signal, where M is a natural number, and a system clock generating unit which generates a system clock signal by dividing the dot clock signal using the division rate.

According to another aspect of the present invention, a method of generating a system clock signal for a display drive integrated circuit which drives a display panel is provided. The method includes outputting a division rate corresponding to a quotient obtained by dividing by M a total number of clock cycles of a dot clock signal corresponding to a clock cycle of a horizontal synchronization signal, where M is a natural number, and generating the system clock signal by dividing the dot clock signal using the division rate.

BRIEF DESCRIPTION OF THE DRAWINGS

The above and other aspects and advantages of the present invention will become readily apparent from the detailed description that follows, with reference to the accompanying drawings, in which:

FIG. 6 is a table illustrating division rates obtained by dividing by 16 the total number of clock cycles of dot clock signals having various frequencies.

DETAILED DESCRIPTION OF THE INVENTION

Figure 1:
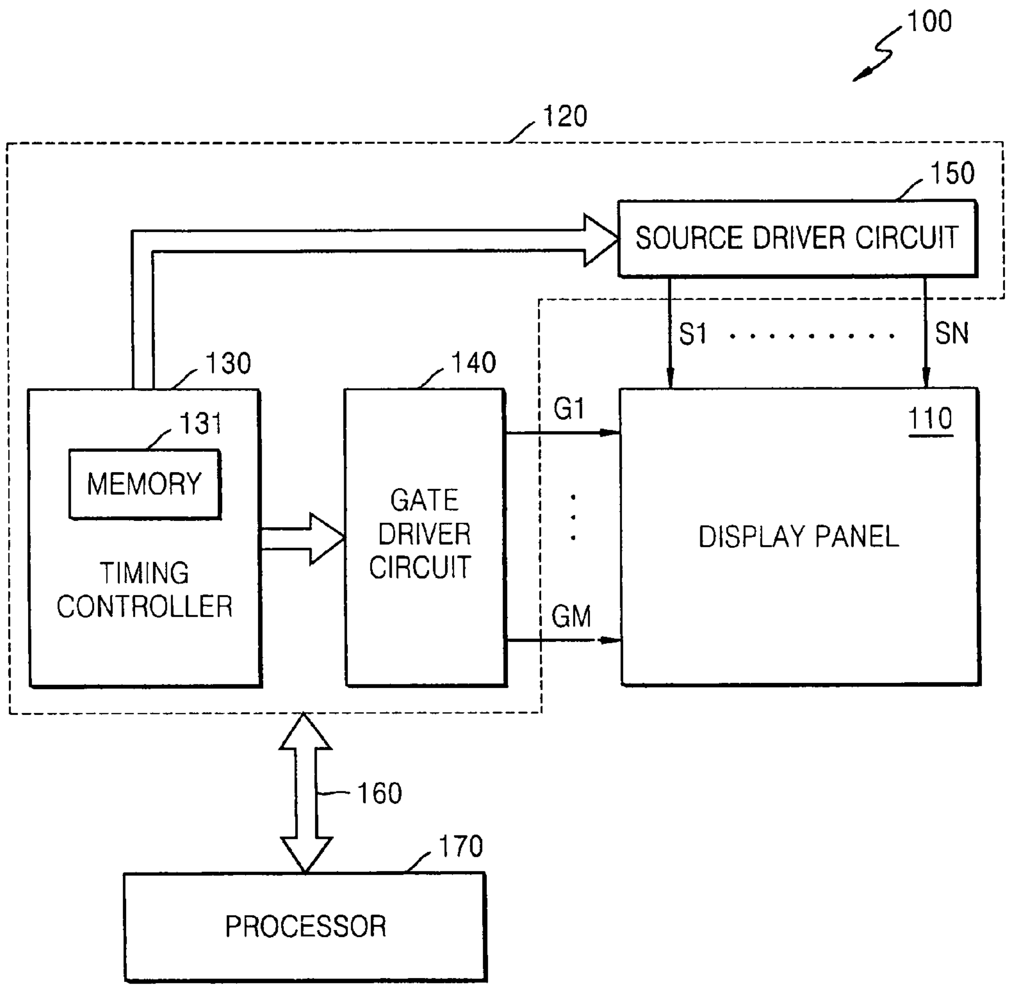
FIG. 1 (PRIOR ART)
FIG. 1 is a block diagram of a conventional display device.

Exemplary but non-limiting embodiments of the present invention will now be described in detail with reference to the accompanying drawings. Like reference numerals denote like elements throughout the drawings.

Figure 2:
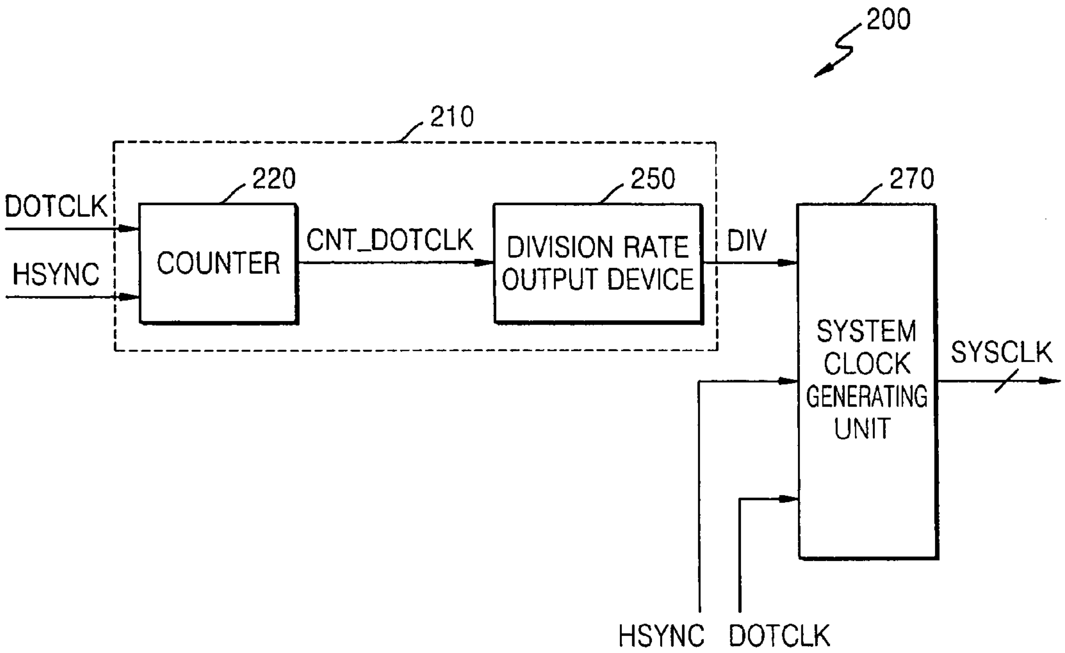
FIG. 2 is a block diagram of a display drive integrated circuit for generating a system clock signal according to an embodiment of the present invention.

FIG. 2 is a block diagram of a display drive integrated circuit 200 for generating a system clock signal according to an embodiment of the present invention. As explained below, the system clock signal may be generated at a constant frequency regardless of frequency changes of a dot clock signal.

Referring to FIG. 2, the display drive integrated circuit 200 includes a division rate output unit 210 and a system clock generating unit 270. The division rate output unit 210 outputs a division rate DIV according to a quotient obtained by dividing by M (M is a natural number) a total number of clock cycles CNT_DOTCLK of a dot clock signal DOTCLK, which correspond to a clock cycle of a horizontal synchronization signal HSYNC. The system clock generating unit 270 generates a system clock signal SYSCLK by dividing the dot clock signal DOTCLK using the division rate DIV.

The division rate output unit 210 may, for example, include a counter 220 and a division rate output device 250. The counter 220 counts the clock cycles CNT_DOTCLK of the dot clock signal DOTCLK which occur during a clock cycle of the horizontal synchronization signal HSYNC. The division rate output device 250 outputs the division rate DIV corresponding to the quotient obtained by dividing by M the total number of clock cycles CNT_DOTCLK of the dot clock signal DOTCLK. Here, M may be $2^K$ (where K is a natural number).

According to an embodiment of the present invention, in the display drive integrated circuit 200, the horizontal synchronization signal HSYNC may have a constant frequency. Also, according to an embodiment of the present invention, in the display drive integrated circuit 200, a vertical synchronization signal VSYNC may have a constant frequency.

Figures 3A, 3B:
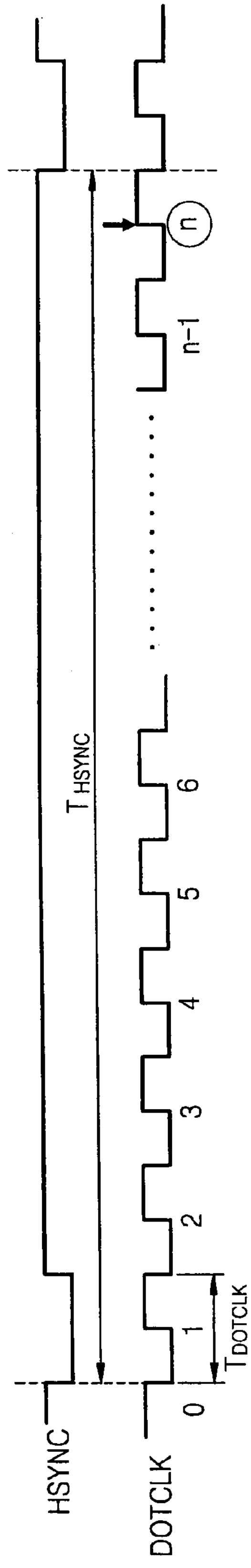
FIG. 3A is a timing diagram for describing the counting of clock cycles of a dot clock signal corresponding to a clock cycle of a horizontal synchronization signal.
FIG. 3B is a table illustrating examples of a division rate corresponding to the bit value of a total number of clock cycles of a dot clock signal, excluding the lower K bits thereof.

FIG. 3A is a timing diagram for describing the counting the number of clock cycles of a dot clock signal during a clock cycle of a horizontal synchronization signal.

FIG. 3B is a table illustrating examples of a division rate obtained by excluding the lower K bits of a binary number representing the number clock cycles of a dot clock signal during a clock cycle of a horizontal synchronization signal.

FIG. 6 is a table illustrating division rates obtained by dividing by 16 the total number of clock cycles of dot clock signals having various frequencies.

The operation of the division rate output unit 210 will now be described with reference to FIGS. 2, 3A, 3B and 6.

The counter 220 receives a horizontal synchronization signal HSYNC and a dot clock signal DOTCLK. The counter 220 counts the number of clock cycles of the dot clock signal DOTCLK which occur during a clock cycle of the horizontal synchronization signal HSYNC. FIG. 3A illustrates a dot clock signal DOTCLK whose clock cycles total n (where n is a natural number). In this case, a clock cycle THSYNC of the horizontal synchronization signal HSYNC is n times longer than a clock cycle TDOTCLK of the dot clock signal DOTCLK.

The division rate output device 250 outputs the division rate DIV according to the quotient obtained by dividing by M the total number (n) of clock cycles CNT_DOTCLK of the dot clock signal DOTCLK. FIG. 6 illustrates division rates DIV obtained by dividing by 16 the total number of clock cycles CNT_DOTCLK of different dot clock signals DOTCLKs. For example, if the total number of clock cycles CNT_DOTCLK of the dot clock signal DOTCLK, which corresponds to a clock cycle of the horizontal synchronization signal HSYNC, ranges from 256 to 271, the value obtained by dividing the clock cycles CNT_DOTCLK of the dot clock signal DOTCLK by 16 ranges from 16 to 16.94, and thus, the division rate DIV is 16. If the total number of clock cycles CNT_DOTCLK of the dot clock signal DOTCLK ranges from 272 to 287, the value obtained by dividing the clock cycles CNT_DOTCLK of the dot clock signal DOTCLK by 16 ranges from 17 to 17.94, and therefore, the division rate DIV is 17.

The division rate output device 250 may utilize only a certain number of the total number of division rates. For example, when the quotient obtained by dividing by M the total number of clock cycles CNT_DOTCLK of the dot clock signal DOTCLK is an odd number, the division rate output device 250 may output as the division rate DIV the value obtained by adding 1 to the quotient or subtracting 1 from the quotient. When the quotient obtained by dividing by M the total number of clock cycles CNT_DOTCLK of the dot clock signal DOTCLK is an even number, the division rate output device 250 may output the quotient as the division rate DIV. For example, referring to FIG. 6, the division rate output device 250 outputs 16 as the division rate DIV when the total number of clock cycles CNT_DOTCLK of the dot clock signal DOTCLK ranges from 256 to 287 (when the value obtained by dividing by 16 the total number of clock cycles CNT_DOTCLK ranges from 16 to 17.94). That is, the division rate output device 250 outputs only even-numbered division rates, thereby halving the total number of division rates DIVs output from the division rate output device 250.

Alternatively, if the quotient obtained by dividing by M the total number of clock cycles CNT_DOTCLK of the dot clock signal DOTCLK is an even number, the division rate output device 250 may output as the division rate DIV the value obtained by adding 1 to the quotient or subtracting 1 from the quotient. Also, when the quotient obtained by dividing by M the total number of clock cycles CNT_DOTCLK of the dot clock signal DOTCLK is an odd number, the quotient may be output as the division rate DIV. That is, the division rate output device 250 outputs only odd-numbered division rates, thereby halving the total number of division rates DIV output from the division rate output device 250.

The division rate output device 250 may output as the division rate DIV by excluding the lower K bits (i.e., by output the higher L−K bits) from the total number of clock cycles CNT_DOTCLK of the dot clock signal DOTCLK, which is expressed with L bits (L is a natural number, and K is a natural number less than L). More specifically, in this case, the division rate output device 250 expresses the total number of clock cycles CNT_DOTCLK of the dot clock signal DOTCLK with L bits, and outputs as the division rate DIV the bit value of the upper L−K bits. In this case, the division rate output device 250 outputs as the division rate DIV the quotient obtained by dividing by $2^K$ the total number of clock cycles CNT_DOTCLK of the dot clock signal DOTCLK.

FIG. 3B is a table illustrating examples where L=10 and K=4. As shown, the division rate DIV is composed of the upper 6 bits of the 10 bit binary number representing the total number of clock cycles CNT_DOTCLK of a dot clock signal DOTCLK.

Figure 4:
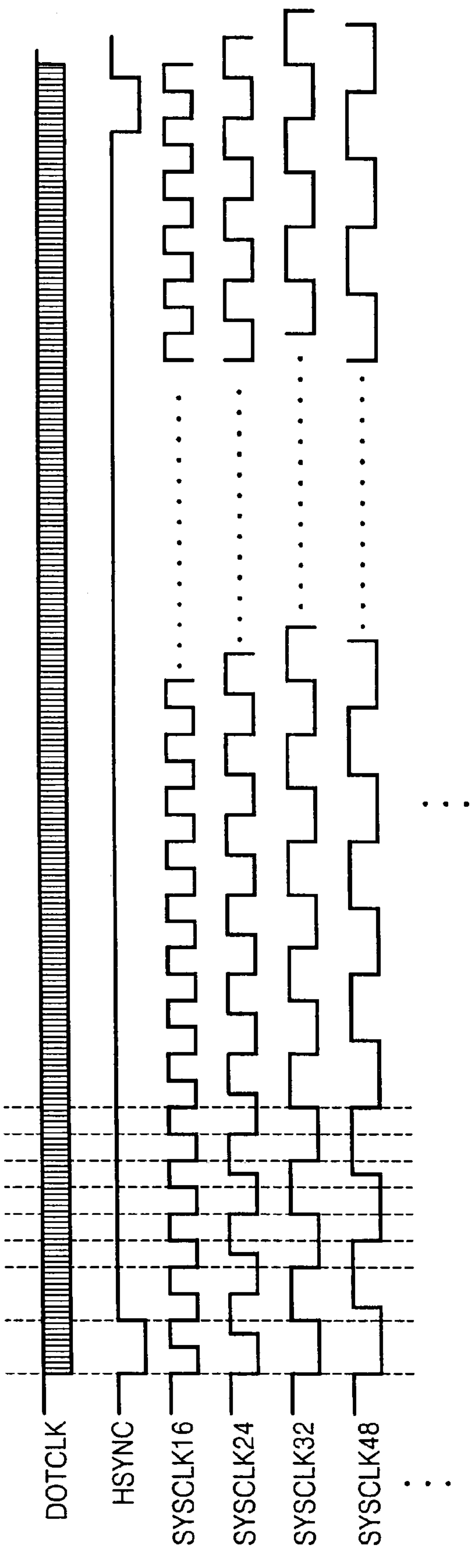
FIG. 4 is a timing diagram for describing a process of generating system clock signals having various frequencies by using various division rates, according to an embodiment of the present invention.

FIG. 4 is a timing diagram illustrating a process of generating system clock signals having various frequencies by using various division rates, according to an embodiment of the present invention. Referring also to FIG. 2, the system clock generating unit 270 receives a division rate DIV from the division rate output unit 210. The system clock generating unit 270 divides a dot clock signal DOTCLK by a value obtained by multiplying the division rate DIV by a predetermined value so as to generate system clock signals SYSCLK16, SYSCLK24, SYSCLK32, and SYSCLK48 having various frequencies. FIG. 4 illustrates the system clock signals SYSCLK16, SYSCLK24, SYSCLK32, and SYSCLK48 that are obtained by dividing the dot clock signal DOTCLK by various values.

Referring to the table of FIG. 6, the total number of clock cycles of a system clock signal SYSCLK, which correspond to a clock cycle of the horizontal synchronization signal HSYNC, is calculated by dividing the total number of clock cycles CNT_DOTCLK of a dot clock signal DOTCLK by the division rate DIV. That is, referring to FIG. 6, a first minimum number of clock cycles (SYSCLK) and a first maximum number of clock cycles (SYSCLK) are obtained by respectively dividing the minimum number of clock cycles (DOT- CLK) and the maximum number of clock cycles (DOTCLK) by the division rate DIV. For example, when a dot clock signal DOTCLK, whose number of the clock cycles CNT_DOTCLK corresponding to a clock cycle of the horizontal synchronization signal HSYNC is 256 (or 271), is divided by the division rate DIV of 16, the number of the clock cycles of the system clock signal SYSCLK, which correspond to a clock cycle of the horizontal synchronization signal HSYNC, is 16 (or 16.94). Also, when the total number of clock cycles CNT_DOTCLK of the dot clock signal DOTCLK is 272 (or 287), the total number of clock cycles of the system clock signal SYSCLK is 16 (or 16.88).

Accordingly, the total number of clock cycles of the system clock signal SYSCLK has a constant value regardless of the total number of clock cycles of the dot clock signal DOTCLK. However, the total number of clock cycles of the system clock signal SYSCLK may have an error. The error is calculated by subtracting the first minimum number of clock cycles (SYSCLK) from the first maximum number of clock cycles (SYSCLK), which are listed in the table of FIG. 6.

According to an embodiment of the present invention, the display drive integrated circuit 200 changes the division rate DIV when the total number of clock cycles CNT_DOTCLK of the dot clock signal DOTCLK changes. Thus, even if the total number of clock cycles CNT_DOTCLK of the dot clock signal DOTCLK changes, the total number of clock cycles of the system clock signal SYSCLK can be maintained at a constant level. That is, according to an embodiment of the present invention, the display drive integrated circuit 200 is capable of outputting the system clock signal SYSCLK at a constant frequency regardless of the frequency of the dot clock signal DOTCLK.

As listed in FIG. 6, when the division rate output device 250 outputs only even-numbered division rates (or odd-numbered division rates), the total number of clock cycles of the system clock signal SYSCLK is a second minimum number of clock cycles or a second maximum number of clock cycles. For example, when the division rate output device 250 outputs only even-numbered division rates, if the total number of clock cycles CNT_DOTCLK of the dot clock signal DOTCLK is 256 (or 271), the total number of clock cycles of the system clock signal SYSCLK is 16 (or 16.94) and the division rate DIV is 16. Also, when the total number of clock cycles CNT_DOTCLK of the dot clock signal DOTCLK is 272 (or 287), the total number of clock cycles of the system clock signal SYSCLK is 17 (or 17.94) and the division rate DIV is 16.

Accordingly, the error of the total number of clock cycles of the system clock signal SYSCLK when the division rate output from the division rate output device 250 is limited to only odd numbers (or only even numbers) is approximately twice the error of the total number of clock cycles of the system clock signal SYSCLK when the division rate output from the division rate output device 250 may be even and odd numbers. That is, in the above case, the total number of clock cycles of the system clock signal SYSCLK has an error of 1.94 (17.94-16).

Figure 5:
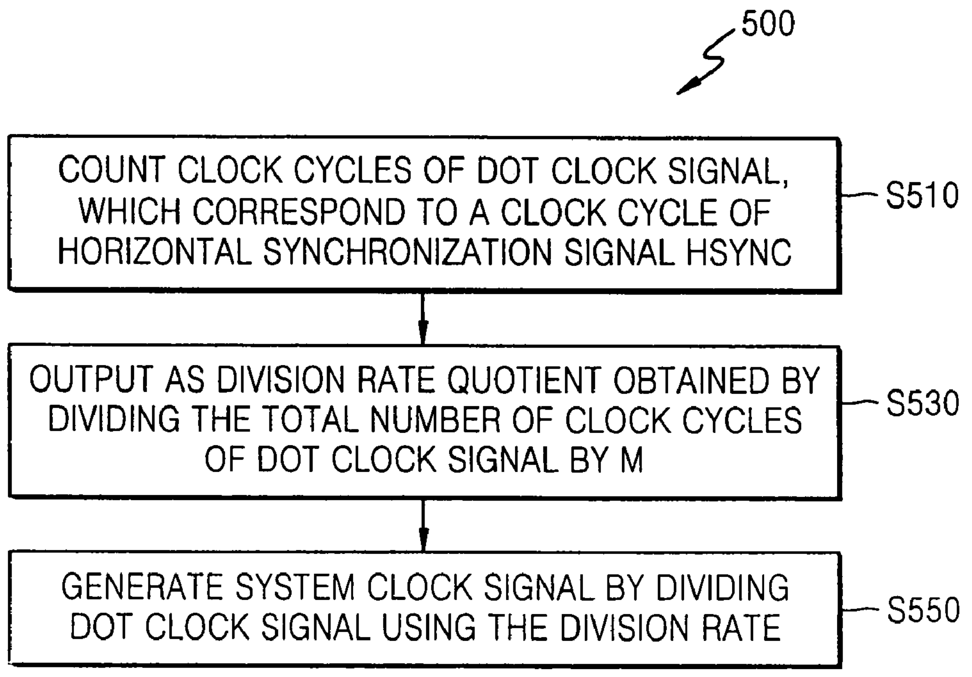
FIG. 5 is a flowchart for describing a method of generating a system clock signal according to an embodiment of the present invention.

FIG. 5 is a flowchart for describing a method 500 of generating a system clock signal having a constant frequency regardless of the frequency of a dot clock signal, according to an embodiment of the present invention. Referring to FIG. 5, the method 500 is related to generating a system clock signal for a display drive integrated circuit that drives a display panel. According to an embodiment of the present invention, the method 500 includes outputting a division rate, and generating a system clock signal (S550). The outputting of the division rate includes outputting as a division rate the quotient obtained by dividing by M (M is a natural number) the total number of clock cycles of a dot clock signal, which correspond to a clock cycle of a horizontal synchronization signal HSYNC. The generating of the system clock signal (S550) includes generating the system clock signal by dividing the dot clock signal using the division rate.

The outputting of the division rate may include counting the clock cycles of the dot clock signal, which correspond to a clock cycle of the horizontal synchronization signal HSYNC (S510), and outputting as the division rate the quotient obtained by dividing by M the total number of clock cycles of the dot clock signal (S530).

In the method 500, M may be $2^K$ (where K is a natural number). The outputting as the division rate (S530) may include outputting as the division rate the upper L−K bits obtained by excluding the lower K bits from the total number of clock cycles of the dot clock signal, which is expressed with L bits (L is a natural number and K is less than L).

As described above, in a display drive integrated circuit and a method for generating a system clock signal according to the present invention, the system clock signal is generated by dividing a dot clock signal by the quotient that is obtained by dividing the total number of clock cycles of the dot clock signal by a predetermined number. Therefore, it is possible to generate a system clock signal having a constant frequency even if the frequency of the dot clock signal changes.

While this invention has been particularly shown and described with reference to exemplary embodiments thereof, it will be understood by those skilled in the art that various changes in form and detail may be made therein without departing from the spirit and scope of the invention as defined by the appended claims.

What is claimed is:

1. A display drive integrated circuit for driving a display panel, comprising:

a division rate output unit, comprising:

a counter which receives a dot clock signal and a horizontal synchronization signal from an external source via an interface, and which outputs a count value equaling a total number of clock cycles of the dot clock signal corresponding to one cycle of the horizontal synchronization signal, and a division rate output device which receives the count value and outputs a division rate value corresponding to an integer portion of a quotient obtained by dividing the count value by M where M is a natural number greater than one; and a system clock generating unit which receives the dot clock signal and the division rate value and in response thereto generates a system clock signal by dividing a frequency of the dot clock signal by a divisor obtained by multiplying the division rate value by a fixed value.

2. The display drive integrated circuit of claim 1, wherein $M=2^K$, where K is a natural number.

3. The display drive integrated circuit of claim 1, wherein the count value output by the counter has L bits, and wherein the division rate output device outputs L−K bits as the division rate value by excluding lower K bits from the L bits output by the counter, where L and K are natural numbers, and K is less than L.

4. The display drive integrated circuit of any one of claims 2 and 3, wherein M=16 and K=4.

5. The display drive integrated circuit of claim 1, wherein, when the quotient obtained by dividing the count value by M is an odd number, the division rate output device outputs as the division rate value a value obtained by adding 1 to the quotient or subtracting 1 from the quotient, and when the quotient obtained by dividing the count value by M is an even number, the division rate output device outputs the quotient as the division rate value.

6. The display drive integrated circuit of claim 1, wherein, when the quotient obtained by dividing the count value by M is an even number, the division rate output device outputs as the division rate value a value obtained by adding 1 to the quotient or subtracting 1 from the quotient, and when the quotient obtained by dividing the count value by M is an odd number, the division rate output device outputs the quotient as the division rate value.

7. The display drive integrated circuit of claim 1, wherein the system clock generating unit generates system clock signals having various frequencies by dividing the frequency of the dot clock signal by an integral multiple of the division rate value.

8. The display drive integrated circuit of claim 1, wherein the horizontal synchronization signal has a constant frequency.

9. The display drive integrated circuit of claim 1, wherein the counter receives the dot clock signal and the horizontal synchronization signal via an RGB interface.

10. A method of generating a system clock signal for a display drive integrated circuit which drives a display panel, the method comprising:

receiving a dot clock signal and a horizontal synchronization signal from an external source via an interface;

counting a number of cycles of the dot clock signal corresponding to one cycle of the horizontal synchronization signal and outputting a count value equaling a total number of clock cycles of the dot clock signal corresponding to one cycle of the horizontal synchronization signal;

dividing the count value by M to produce a quotient, where M is a natural number;

outputting a division rate value corresponding to an integer portion of the quotient; and generating the system clock signal by dividing a frequency of the dot clock signal by a divisor obtained by multiplying the division rate value by a fixed value.

11. The method of claim 10, wherein $M=2^K$, where K is a natural number.

12. The method of claim 10, wherein the count value has L bits, and wherein L−K bits are output as the division rate value by excluding lower K bits from the L bits, where L and K are natural numbers, and K is less than L.

13. The method of any one of claims 11 and 12, wherein M=16 and K=4.

14. The method of claim 10, wherein, when the quotient obtained by dividing the count value by M is an odd number, the division rate value is output as a value obtained by adding 1 to the quotient or subtracting 1 from the quotient, and when the quotient obtained by dividing the count value by M is an even number, the quotient is output as the division rate value.

15. The method of claim 10, wherein, when the quotient obtained by dividing the count value by M is an even number, the division rate value is output as a value obtained by adding 1 to the quotient or subtracting 1 from the quotient, and when the quotient obtained by dividing the count value by M is an odd number, the quotient is output as the division rate value.

16. The method of claim 10, wherein the generating of the system clock signal comprises generating system clock signals having various frequencies by dividing the frequency of the dot clock signal using integral multiples of the division rate value.

17. The method of claim 10, wherein the horizontal synchronization signal has a constant frequency.

18. The method of claim 10, wherein receiving the dot clock signal and the horizontal synchronization signal comprises receiving the dot clock signal and the horizontal synchronization signal via an RGB interface.

* * * * *